(12) United States Patent
Kikuchi et al.

(10) Patent No.: US 9,096,162 B2
(45) Date of Patent: Aug. 4, 2015

(54) INFORMATION DISPLAY SYSTEM FOR VEHICLE, INFORMATION DISPLAY METHOD FOR VEHICLE, VEHICLE AND MOUNTING MEMBER

(71) Applicant: HONDA MOTOR CO., LTD., Tokyo (JP)

(72) Inventors: Takehiko Kikuchi, Wako (JP); Daisuke Nakagawa, Wako (JP); Takeshi Kanae, Wako (JP); Ryosuke Ibata, Wako (JP); Hiroki Nakajima, Wako (JP); Kiyoshi Katagiri, Wako (JP); Takashi Ozeki, Wako (JP); Satoshi Honma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 13/752,400

(22) Filed: Jan. 29, 2013

(65) Prior Publication Data

US 2013/0234845 A1    Sep. 12, 2013

(30) Foreign Application Priority Data

Mar. 7, 2012  (JP) .................................. 2012-050676

(51) Int. Cl.
  *B60Q 1/00*  (2006.01)
  *B60R 7/00*  (2006.01)
  *B60K 37/02*  (2006.01)

(52) U.S. Cl.
  CPC . *B60Q 1/00* (2013.01); *B60K 37/02* (2013.01); *B60R 7/00* (2013.01); *B60K 2350/1064* (2013.01); *B60K 2350/2013* (2013.01); *B60Y 2200/12* (2013.01)

(58) Field of Classification Search
  CPC ........ B60K 35/00; B60K 37/00; B60K 37/04; B60Q 1/00; B60R 7/00; B60R 7/06; G01C 21/265
  USPC ............................ 224/545; 340/438; 345/158
  See application file for complete search history.

(56) References Cited

U.S. PATENT DOCUMENTS

| 4,983,951 | A * | 1/1991 | Igarashi et al. ................ 340/461 |
| 6,224,222 | B1 * | 5/2001 | Inoguchi et al. ................ 362/29 |
| 6,249,744 | B1 * | 6/2001 | Morita ........................... 701/487 |

(Continued)

FOREIGN PATENT DOCUMENTS

| JP | 2002-286482 | 10/2002 |
| JP | 2004-146976 | 5/2004 |

*Primary Examiner* — Benjamin C Lee
*Assistant Examiner* — Stephen Burgdorf
(74) *Attorney, Agent, or Firm* — Mori & Ward, LLP

(57) ABSTRACT

An information display system for a vehicle includes an information display device, a mounting member, and a personal digital assistant. The information display device is mounted on a vehicle and is configured to display vehicle information. The mounting member is fixed to the vehicle. The personal digital assistant is detachably mounted on the vehicle via the mounting member in such a manner that at least a part of the vehicle information displayed on the information display device becomes non-visible by the personal digital assistant and includes a communication device and a display device. The communication device is configured to acquire at least vehicle information which is displayed on the information display device and which becomes non-visible from an electric accessory unit mounted on the vehicle. The display device is configured to display the vehicle information acquired using the communication device.

14 Claims, 14 Drawing Sheets

(56) References Cited

U.S. PATENT DOCUMENTS

| | | | |
|---|---|---|---|
| 6,434,450 B1 * | 8/2002 | Griffin et al. | 701/1 |
| 6,570,628 B1 * | 5/2003 | Hirano | 349/11 |
| 7,209,830 B2 * | 4/2007 | Takahashi | 701/470 |
| 7,333,009 B2 * | 2/2008 | Schedivy | 340/461 |
| 7,382,237 B2 * | 6/2008 | Stoschek et al. | 340/438 |
| 7,714,800 B2 * | 5/2010 | Kobayashi | 345/1.1 |
| 2007/0138347 A1 * | 6/2007 | Ehlers | 246/1 R |
| 2007/0247377 A1 * | 10/2007 | Funayose | 343/711 |
| 2009/0043446 A1 * | 2/2009 | Drew et al. | 701/33 |
| 2010/0187273 A1 * | 7/2010 | Niwai et al. | 224/545 |
| 2012/0097723 A1 * | 4/2012 | Khatchatrian | 224/483 |
| 2012/0160054 A1 * | 6/2012 | Kawai et al. | 74/551.1 |
| 2013/0137491 A1 * | 5/2013 | Tanaka et al. | 455/569.1 |

* cited by examiner

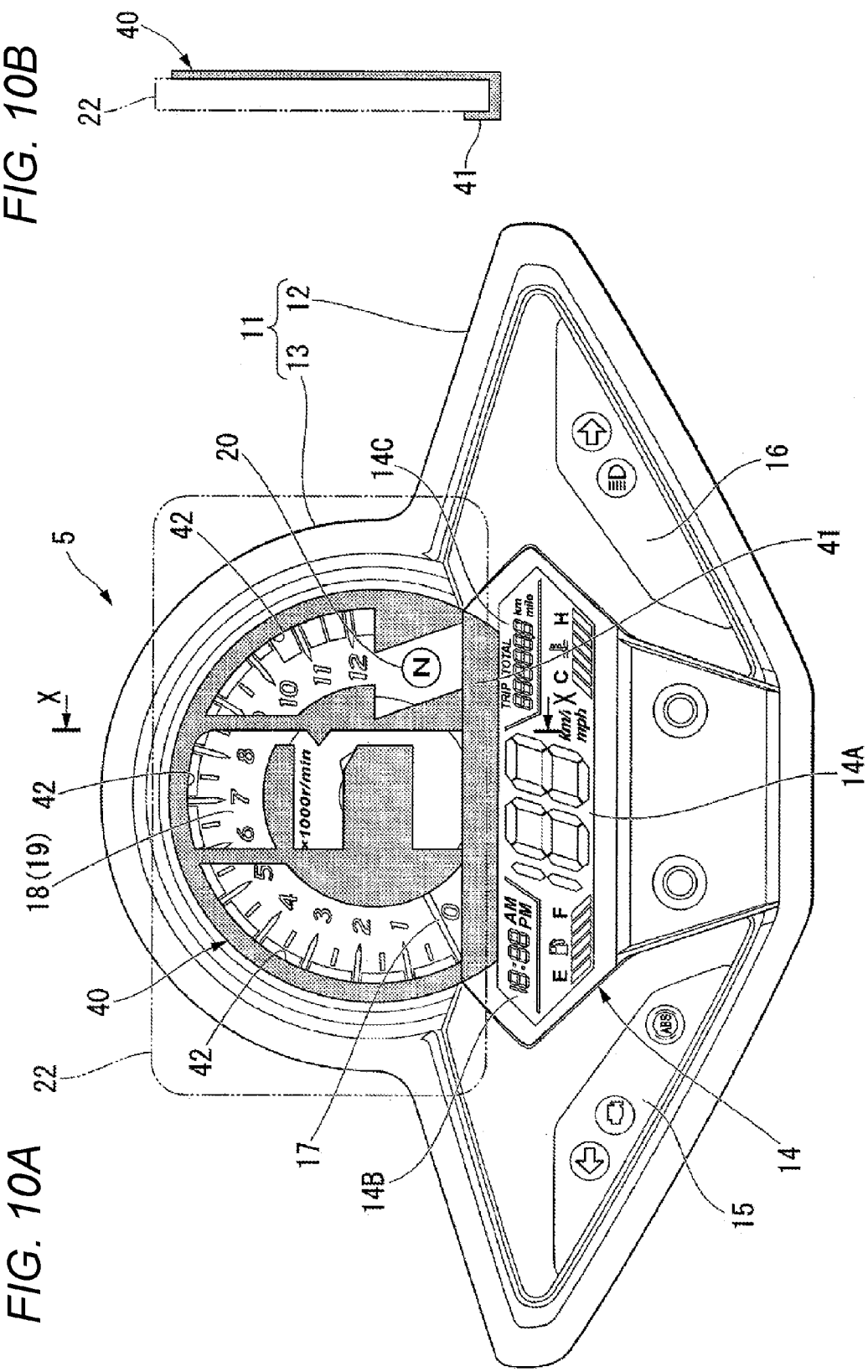

INFORMATION DISPLAY SYSTEM FOR VEHICLE, INFORMATION DISPLAY METHOD FOR VEHICLE, VEHICLE AND MOUNTING MEMBER

CROSS-REFERENCE TO RELATED APPLICATIONS

The present application claims priority under 35 U.S.C. §119 to Japanese Patent Application No. 2012-050676, filed Mar. 7, 2012. The contents of this application are incorporated herein by reference in their entirety.

BACKGROUND OF THE INVENTION

1. Field of the Invention

The present invention relates to an information display system for a vehicle, an information display method for a vehicle, a vehicle, and a mounting member.

2. Discussion of the Background

Recently, a technique which provides a user various information by making use of a personal digital assistant in a vehicle has been attracting attention. As this kind of conventional technique, JP-A-2004-146976 discloses a technique that vehicle information such as warning information is displayed on a personal digital assistant by transmitting information relating to a vehicle to the personal digital assistant. Further, JP-A-2002-286482 discloses a technique that a personal digital assistant is arranged at a place other than in a position of a vehicle meter arranged in a field of vision of a driver, and some information is transmitted to a meter side from the personal digital assistant and is displayed on the personal digital assistant.

When a personal digital assistant is used as a display device for a vehicle as a technique disclosed in the above-mentioned JP-A-2004-146976, it has been a task to secure a space for mounting the personal digital assistant. In a relatively miniaturized vehicle such as a saddle-ride-type vehicle which has no margin with respect to a mounting space, there arises a case where mounting of the personal digital assistant is difficult.

To the contrary, in the technique disclosed in JP-A-2002-286482, in view of the above-mentioned restriction imposed on the space for mounting the personal digital assistant, the personal digital assistant is mounted in a position where the personal digital assistant will not become an obstacle on the vehicle, some information is transmitted to a meter side from the personal digital assistant and is displayed on the personal digital assistant thus displaying important information in a compact manner.

SUMMARY OF THE INVENTION

According to one aspect of the present invention, an information display system for a vehicle includes an information display device, a mounting member, and a personal digital assistant. The information display device is mounted on a vehicle and is configured to display vehicle information. The mounting member is fixed to the vehicle. The personal digital assistant is detachably mounted on the vehicle via the mounting member in such a manner that at least a part of the vehicle information displayed on the information display device becomes non-visible by the personal digital assistant and includes a communication device and a display device. The communication device is configured to acquire at least vehicle information which is displayed on the information display device and which becomes non-visible from an electric accessory unit mounted on the vehicle. The display device is configured to display the vehicle information acquired using the communication device.

According to another aspect of the present invention, in an information display method for a vehicle, vehicle information is displayed on an information display device. At least vehicle information which is displayed on the information display device and which becomes non-visible by a personal digital assistant is acquired from the vehicle using a communication device of the personal digital assistant. The vehicle information acquired using the communication device is displayed on a display device of the personal digital assistant.

According to further aspect of the present invention, a vehicle includes an information display device and a mounting member. The information display device is configured to display vehicle information. The mounting member is to mount a personal digital assistant on the vehicle in such a manner that at least a part of the vehicle information displayed on the information display device becomes non-visible by the personal digital assistant. The personal digital assistant includes a communication device and a display device. The communication device is configured to acquire at least vehicle information displayed on the information display device which becomes non-visible from an electric accessory unit mounted on the vehicle. The display device is configured to display the vehicle information acquired using the communication device.

According to the other aspect of the present invention, a mounting member includes a first portion and a second portion. The first portion is to be mounted on a vehicle. The second portion is to detachably support a personal digital assistant including a communication device and a display device. The communication device is configured to acquire vehicle information outputted from an electric accessory unit mounted on the vehicle. The display device is configured to display the vehicle information acquired using the communication device. The second portion is provided in such a manner that at least a part of the vehicle information displayed on an information display device of the vehicle becomes non-visible by the personal digital assistant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 8A and 8B are views showing a handle of a motorcycle and the periphery of the handle for explaining a second embodiment, wherein FIG. 8A is a view showing the handle and the periphery of the handle in a state where a mounting member according to the second embodiment is mounted, and FIG. 8B is the view showing a modification of the embodiment.

FIGS. 9A and 9B are views showing another modification of the second embodiment, wherein FIG. 9A is a perspective view of a mounting member according to the modification, and FIG. 9B is the view showing the handle and the periphery of the handle in a state where the mounting member according to the modification is mounted.

FIGS. 10A and 10B are views showing a meter case in a state where a mounting member according to a third embodiment is mounted, wherein FIG. 10A is a view showing an external appearance of the meter case, and FIG. 10B is a cross-sectional view taken along a line X-X in FIG. 10A.

DESCRIPTION OF THE EMBODIMENTS

Figure 1:
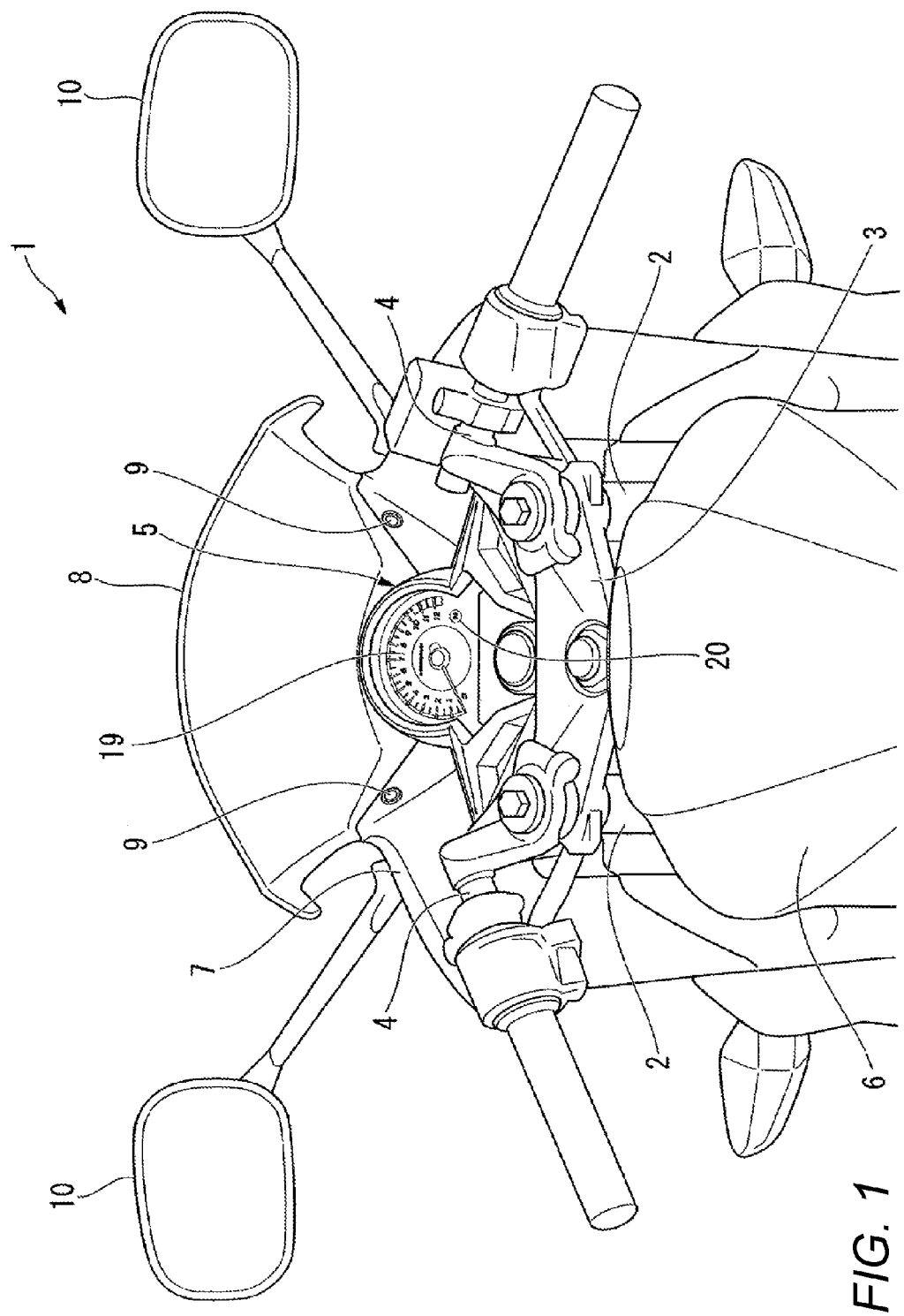
FIG. 1 is a view showing a handle of a motorcycle which is one example of a vehicle to which a first embodiment is applied and the periphery of the handle.

The embodiments will now be described with reference to the accompanying drawings, wherein like reference numerals designate corresponding or identical elements throughout the various drawings.

First Embodiment

FIG. 1 shows a handle of a motorcycle 1 which is one example of a vehicle to which the first embodiment of the present invention is applied and the periphery of the handle. In FIG. 1, a deep side on a paper surface is a front side of the vehicle, and a viewer's side on the paper surface is a rear side of the vehicle. Hereinafter, the left and right direction and the upper and lower direction are defined based on this direction and the direction as viewed from a rider with reference to this direction, and these directions are suitably used in the explanation. In this motorcycle 1, top portions of a pair of left and right front forks 2, 2 are connected to each other by a top bridge 3, and left and right handles 4, 4 are fixed to the upper portions of the front forks 2, 2 above the top bridge 3 in a state that the left and right handles 4, 4 extend outwardly in the vehicle widthwise direction.

A meter case 5 which constitutes an information display device is arranged in front of the top bridge 3, and a fuel tank 6 is arranged behind the top bridge 3. Although not shown in the drawing, a seat is arranged behind the fuel tank 6, and a rider (user) takes a riding posture by gripping the above-mentioned handles 4, 4 in a state where the rider is seated on the seat. The meter case 5 is positioned within a field of view of the rider in the riding posture, and extends in the vehicle longitudinal direction and in the vehicle widthwise direction.

The meter case 5 is mounted on an upper cowl 7 made of a resin material by way of a vibration-proof rubber, and the upper cowl 7 extends toward a front side and both sides thus covering the meter case 5 from the front side and both sides. A screen 8 made of a transparent resin material is mounted on an upper portion of the upper cowl 7 in an erected manner. The screen 8 extends obliquely in the upward and rearward direction from the upper portion of the upper cowl 7, and the meter case 5 is covered with the screen 8 from above.

The screen 8 is fastened to the upper portion of the upper cowl 7, and a plurality of bolt insertion holes are formed in the screen 8 and the upper cowl 7 respectively. In FIG. 1, the bolts 9, 9 which are inserted into two bolt insertion holes formed in portions of the upper cowl 7 positioned outside the meter case 5 in the vehicle widthwise direction are shown. The upper cowl 7 and the screen 8 are fastened to each other by a plurality of bolts including these bolts 9, 9 in a state where the upper cowl 7 and the screen 8 overlap with each other. A pair of left and right rearview mirrors 10, 10 is mounted on both side portions of the upper cowl portion 7 in an erected manner.

Figure 2:
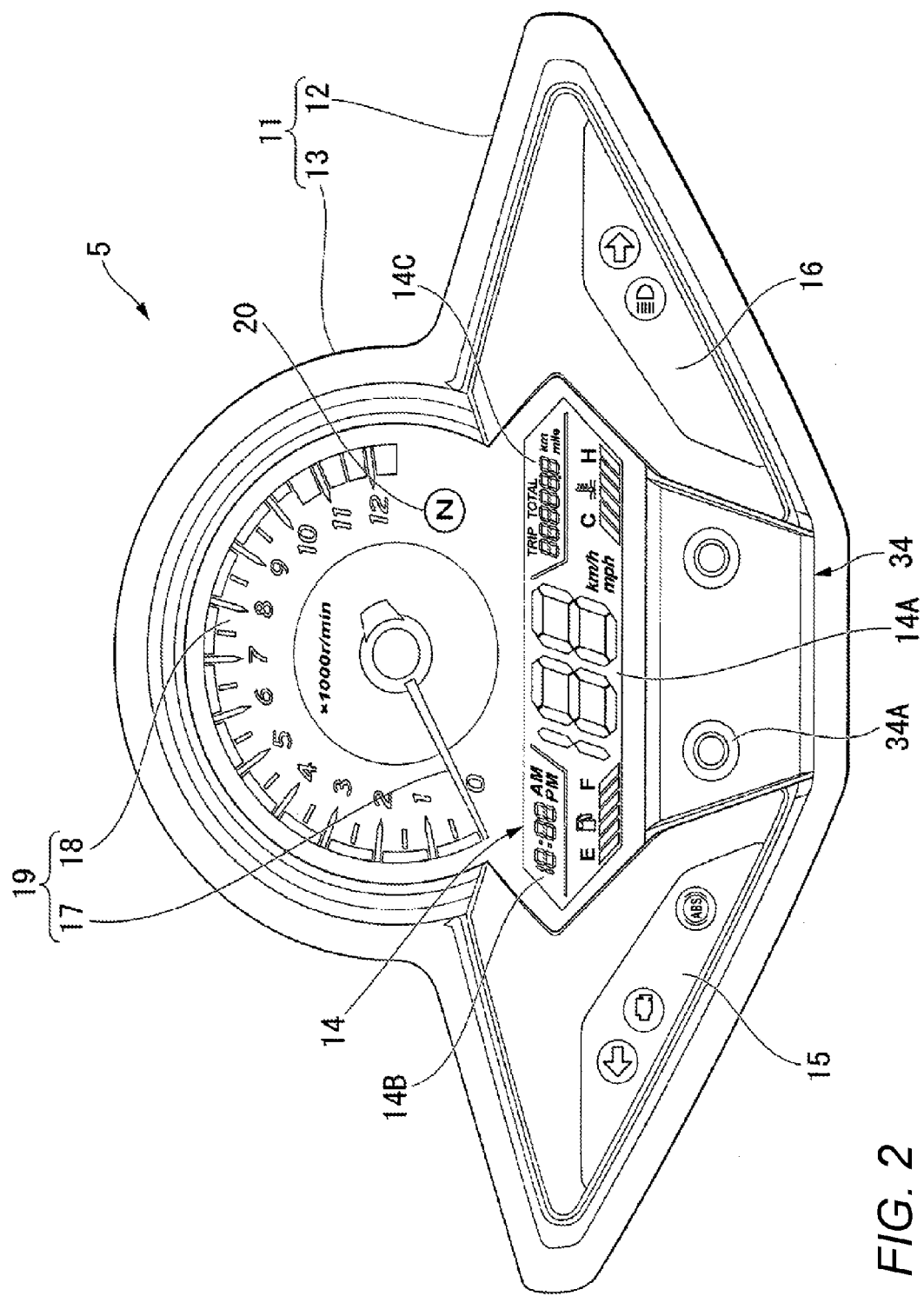
FIG. 2 is a view showing a meter case which the motorcycle includes.

FIG. 2 is an enlarged view of the meter case 5. The meter case 5 is configured such that a frame portion 11 made of a resin material is mounted (fixed) to the vehicle in such a manner that the frame portion 11 cannot be removed from the vehicle, a plurality of analogue and digital meters which display vehicle information toward a rider's side are housed in the inside of the frame portion 11, and these meters are covered with a cover made of a transparent resin material.

The frame portion 11 includes: a base frame portion 12 which is positioned on a rear side in the longitudinal direction of the vehicle, extends in the vehicle widthwise direction, and has a center region of a front portion thereof in the vehicle widthwise direction cut away thus opening frontwardly; and a circular front frame portion 13 which is formed in such a manner that the front frame portion 13 is connected to both cut-away end portions of the base frame portion 12 and projects frontwardly. A liquid crystal panel 14 which digitally displays vehicle information is arranged at a center front portion within the base frame portion 12. A left panel 15 on which a lamp which is turned on when a direction indicator sets the left as the indication direction and the like are mounted is arranged at a rear left portion within the base frame portion 12. A right panel 16 on which a lamp which is turned on when the direction indicator sets the right as the indication direction and the like are mounted is arranged at a rear right portion within the base frame portion 12.

The liquid crystal panel 14, and the left panel 15 and the right panel 16 are arranged in a spaced-apart manner from each other by a predetermined distance thus forming a gap therebetween. A panel 34 on which a switch 34A for changing over a display mode of the liquid crystal panel 14 is mounted below the liquid crystal panel 14 and between the left panel 15 and the right panel 16, for example.

In this embodiment, a speed display part 14A, a time display part 14B, a traveling distance display part 14C and the like are mounted on the liquid crystal panel 14, wherein the speed display part 14A is positioned at the center of the liquid crystal panel 14, the time display part 14B is positioned on a left side of the speed display part 14A, and the traveling distance display part 14C is positioned on a right side of the speed display part 14A. These speed display part 14A, time display part 14B, traveling distance display part 14C and the like receive information outputted from an electric accessory unit not shown in the drawing which is mounted on the motorcycle 1, and display the information thereon.

On the other hand, an analog tachometer 19 is arranged in the inside of the front frame portion 13. In the tachometer 19, a pointer 17 is rotated corresponding to an engine rotational speed so as to point an appropriate portion of an engine rotational speed display 18 arranged on a back surface side of a pointer 17 with a distal end of the pointer 17. A neutral lamp 20 is mounted on a portion of the tachometer 19 which is positioned on a liquid crystal panel 14 side and also on a right side of the liquid crystal panel 14. These tachometer 19 and neutral lamp 20 receive information outputted from the electric accessory unit not shown in the drawing and mounted on the motorcycle 1, and display the information thereon. To explain an information display part also in conjunction with FIG. 1, the information display part of the meter case 5 with which the liquid crystal panel 14 and the tachometer 19 are contiguously formed is inclined in a slightly raised manner with respect to the horizontal direction for securing visibility of a rider.

Figure 7:
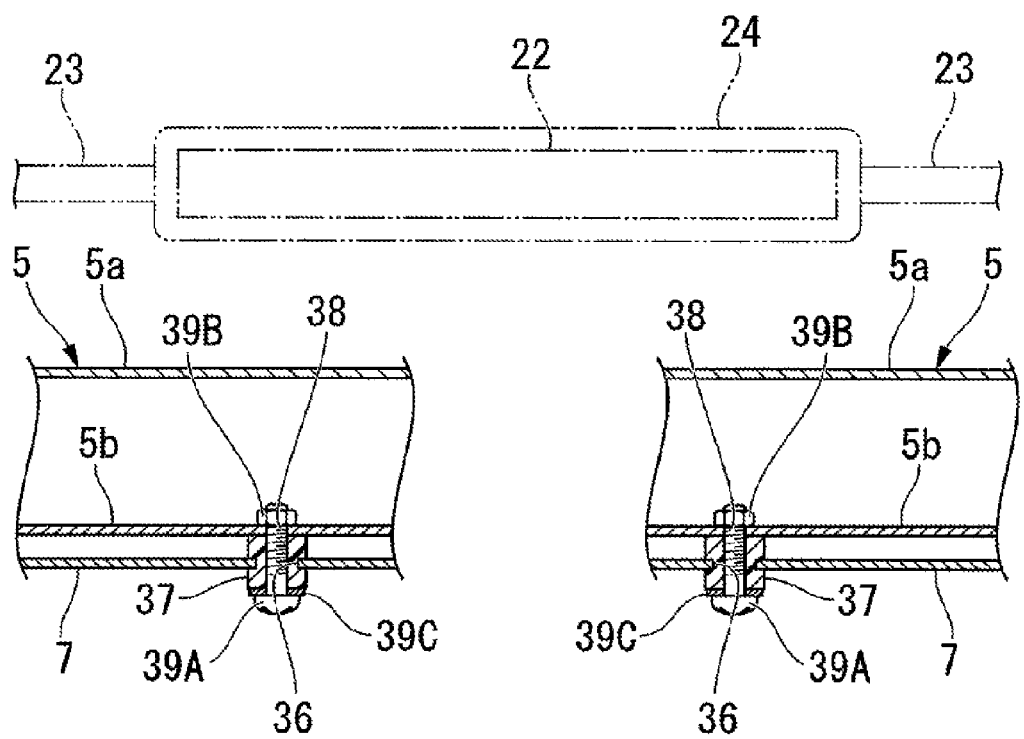
FIG. 7 is a schematic cross-sectional view of the meter case, and is also a view for explaining the arrangement of the meter case and the personal digital assistant.

Further, FIG. 7 shows a schematic longitudinal cross section of the meter case 5. A cylindrical vibration-proof rubber 37 is fitted in a fitting hole 36 formed in the upper cowl 7. One end of the vibration-proof rubber 37 is spaced apart from the upper cowl 7, and one end of the vibration-proof rubber 37 is brought into contact with a lower surface of the meter case 5. The meter case 5 has the vertically split structure and is constituted of an upper case 5a and a lower case 5b. The vibration-proof rubber 37 is brought into contact with the lower case 5b, and a bolt insertion hole 38 is formed in the lower case 5b. A fastening bolt 39A is inserted into bolt insertion hole 38 toward one end side of the vibration-proof rubber 37 from the other end side of the vibration-proof rubber 37. The fastening bolt 39A passes through the bolt insertion hole 38 formed in the lower case 5b, a nut 39B is fastened to a distal end of the fastening bolt 39A which passes through the bolt insertion hole 38, and the nut 39B is brought into contact with an inner surface of the lower case 5b. A head portion of the fastening bolt 39A is brought into contact with an end portion of the vibration-proof rubber 37 on the other end side by way of a washer 39C. A plurality of vibration-proof rubbers 37 having the above-mentioned constitution are arranged between the upper cowl 7 and the meter case 5.

In this manner, the meter case 5 is connected to the upper cowl 7 and the plurality of vibration-proof rubbers 37 are arranged between the meter case 5 and the upper cowl 7 so that the meter case 5 is elastically supported on the upper cowl 7. For the sake of facilitating the explanation, the fastening bolts 39A and the nuts 39B are not shown in cross section in FIG. 7.

Figure 3:
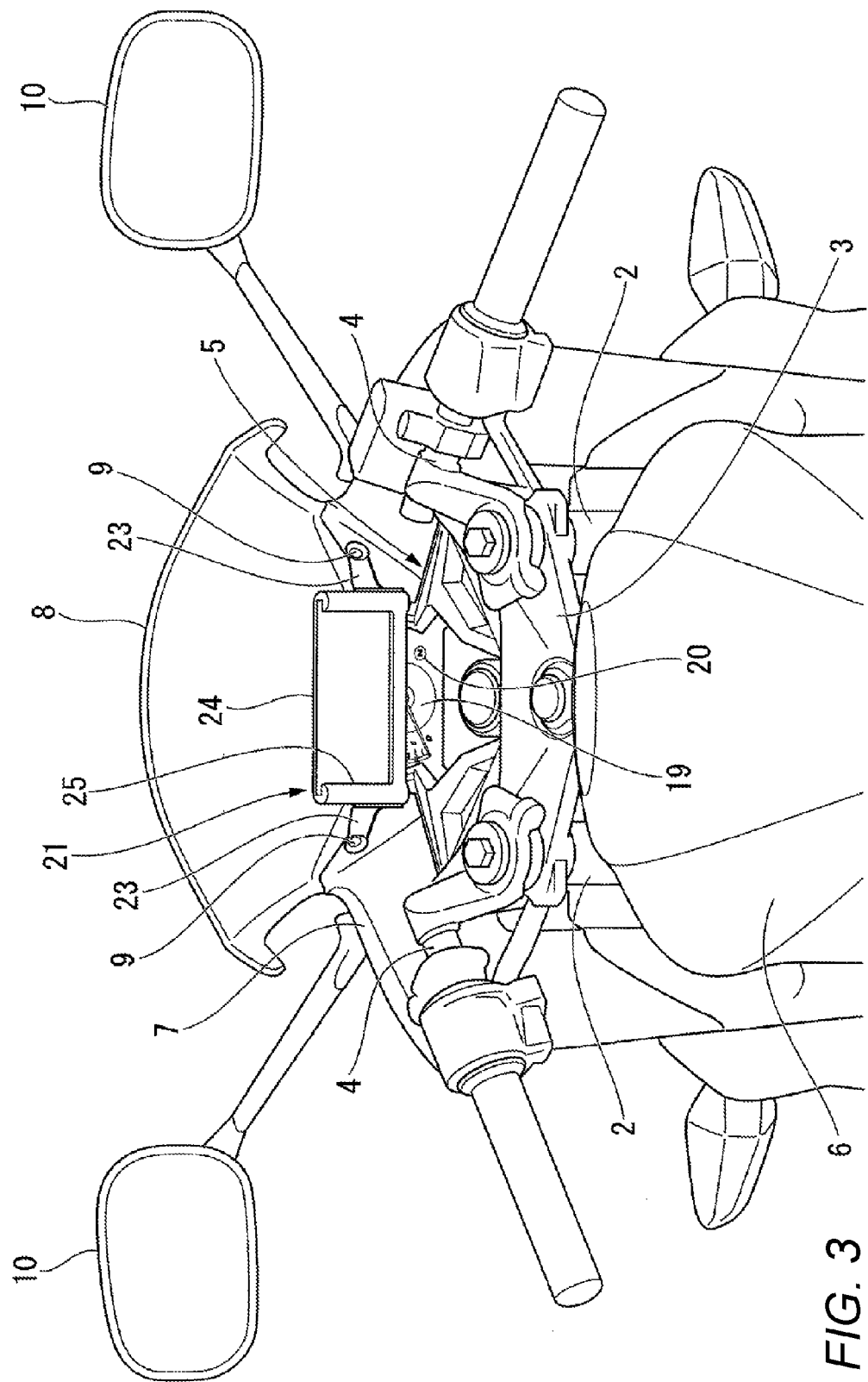
FIG. 3 is a view showing the handle of the same motorcycle and the periphery of the handle in a state where a mounting member for mounting a personal digital assistant is fixed to the motorcycle.
Figure 4:
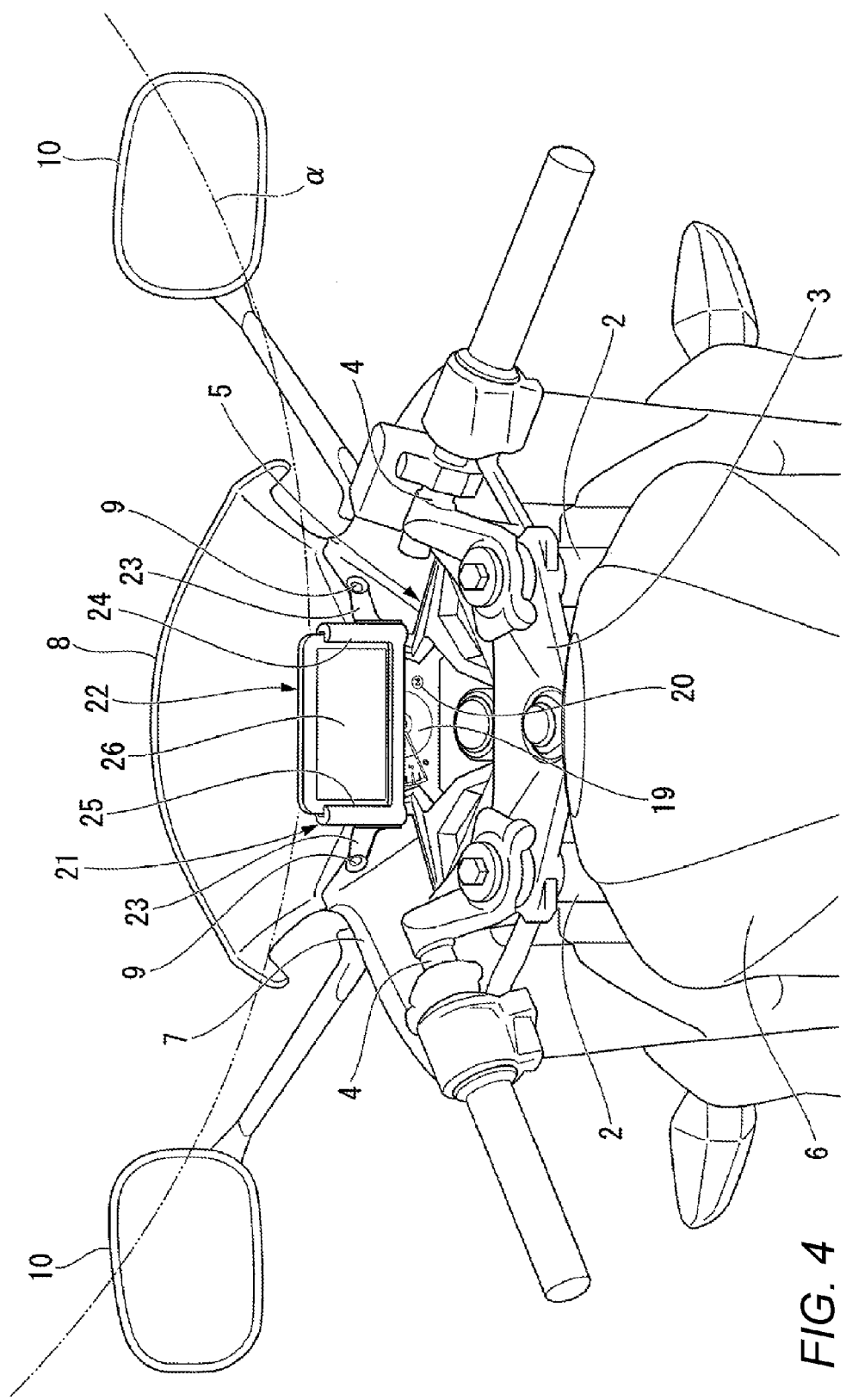
FIG. 4 is a view showing the handle of the same motorcycle and the periphery of the handle in a state where the personal digital assistant is mounted on the mounting member.
Figure 5:
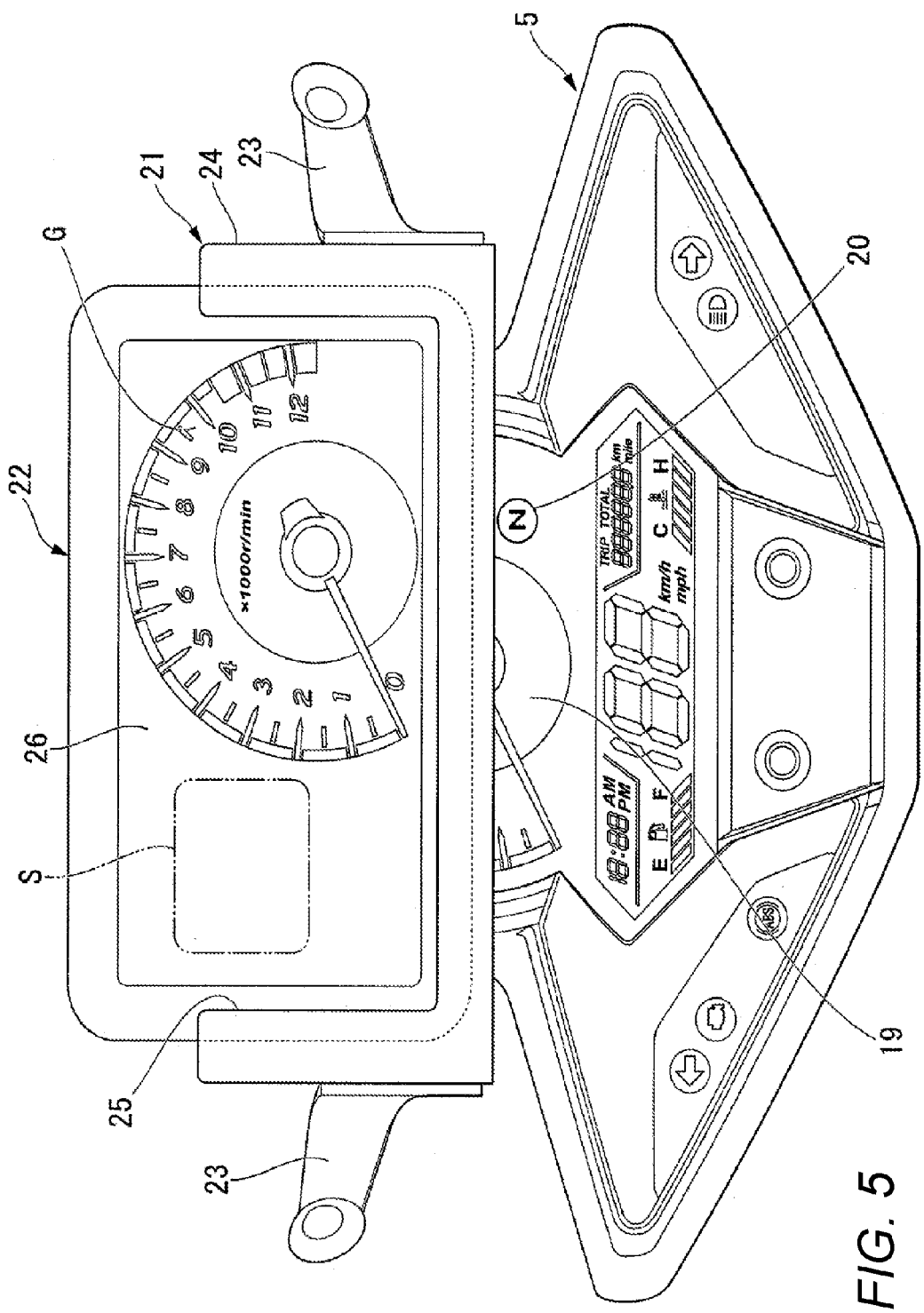
FIG. 5 is a view showing the meter case and the personal digital assistant in a state where the personal digital assistant is mounted on the mounting member, and is also a view showing a state where an image is displayed on the personal digital assistant.

In this embodiment, in the motorcycle 1, as shown in FIG. 3, a mounting member 21 shown in the drawing is fixed to a vehicle side by fastening the mounting member 21 together with the screen 8 and the upper cowl 7 using the bolts 9, 9 for fastening the screen 8 and the upper cowl 7 with each other and, as shown in FIG. 4 and FIG. 5, a personal digital assistant 22 is mounted on the mounting member 21 such that the tachometer 19 becomes non-visible, and vehicle information is displayed on the personal digital assistant 22 thus providing an information display to a rider.

Figure 6:
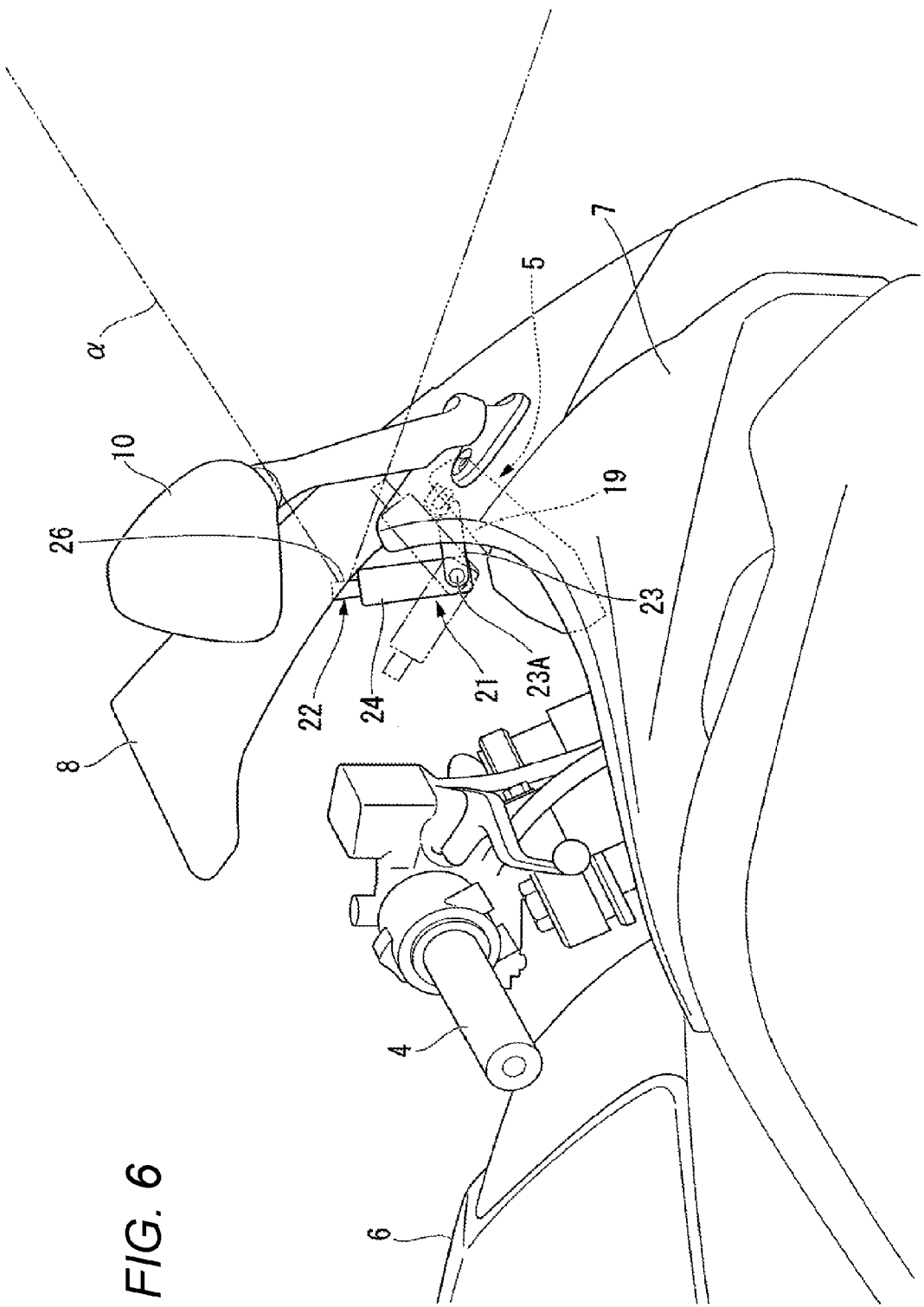
FIG. 6 is a side view of the motorcycle in a state where the personal digital assistant is mounted on the mounting member.

As shown in FIG. 3 and FIG. 6, according to this embodiment, a base portion of the mounting member 21 is fixed to the upper cowl 7 using the left and right bolts 9, 9. The mounting member 21 includes: a pair of left and right stays 23, 23 which extends toward a rider's side; and a holder case 24 which is supported between distal ends of the stays 23, 23 and is rotatable in the pitch direction about a horizontal axis which extends along the vehicle widthwise direction. The left and right stays 23, 23 are arranged on left and right sides such that the stays 23, 23 sandwich the tachometer 19 (front frame portion 13) therebetween, the left stay 23 extends rearward while passing along a left side of the tachometer 19, and the right stay 23 extends rearward while passing along a right side of the tachometer 19.

The stays 23, 23 have distal ends thereof extended toward a rear side of the front frame portion 13 in which the tachometer 19 is housed from the upper cowl 7, and hinge shafts 23A, 23A (see FIG. 6) are extended toward the inside in the vehicle widthwise direction from the distal ends of the respective stays 23, 23 thus supporting the holder case 24 by these hinge shafts 23A, 23A. Due to such a constitution, the holder case 24 mounted on the stays 23, 23 is held such that the holder case 24 straddles the tachometer 19 in the lateral direction with a gap formed between the holder case 24 and the tachometer 19 (the holder case 24 being spaced apart from tachometer 19).

On the other hand, the holder case 24 is a rectangular case body whose longitudinal direction extends along the vehicle widthwise direction. The holder case 24 is opened over an approximately whole region thereof in the longitudinal direction so as to enable the accommodation of the personal digital assistant 22 thereinto from one side thereof in the lateral direction, and both side portions of the holder case 24 on the other side in the lateral direction are supported on the distal ends of the stays 23, 23. As shown in FIG. 4, the holder case 24 has a window portion 25 which is formed by cutting away a surface of the holder case 24 on a rider's side so as to expose a display part 26 of the accommodated personal digital assistant 22 to a rider's side.

To explain this embodiment in conjunction with FIG. 4, the personal digital assistant 22 is held by the mounting member 21 in such a manner that the personal digital assistant 22 is slidably accommodated in the inside of the holder case 24 from the opening portion formed on one side of the holder case 24 in the lateral direction, and the personal digital assistant 22 is engaged between edge portions which form the window portion 25 and a back surface portion of the holder case 24 which faces a side where the window portion 25 is formed in an opposed manner. That is, the personal digital assistant 22 is held such that a rider can visually recognize the display part 26 through the window part 25. In this embodiment, although the tachometer 19 becomes hardly viewable except for a lower portion of the tachometer 19 in a state where the personal digital assistant 22 is held by the holder case 24, the neutral lamp 20 is in a viewable state.

The personal digital assistant 22 is a so-called smart phone, that is, a telephonic-call-capable personal digital assistant. The personal digital assistant 22 includes: a communication part which acquires vehicle information such as a speed, an engine rotational speed and a gear position outputted from the electric accessory unit mounted on the motorcycle 1; and the display part 26 which displays the vehicle information acquired using the communication part.

The communication part of the personal digital assistant 22 may be either a radio communication means or a cable communication means. In a case where the radio communication means is adopted as the communication part, a mode may be considered where a radio transmission part is arranged on the electric accessory unit mounted on the motorcycle 1, and communication is made in accordance with a proximity communication standard such as Bluetooth (registered trademark) or the like, for example. Further, in a case where the cable communication means is adopted, it is necessary to route around a cord for connecting the electric accessory unit and a connector of the personal digital assistant 22 to each other. In such a case, for example, a connector to which the connector of the personal digital assistant 22 is connected may be arranged in the holder case 24.

In this embodiment, the personal digital assistant 22 has at least a function of acquiring vehicle information on an engine rotational speed which is displayed by the tachometer 19 on the meter case 5 and becomes non-visible due to the arrangement of the personal digital assistant 22 using the communication part, and a function of displaying such vehicle information on the display part 26. FIG. 5 shows an example where the personal digital assistant 22 displays an engine rotational speed on the display part 26 thereof. In the drawing, an image G of an analogue tachometer is displayed on the display part 26, and a pointer is rotated corresponding to the engine rotational speed in the image G. Due to such a constitution, a vehicle display function on the motorcycle 1 is not impaired even when the vehicle information becomes non-visible by the personal digital assistant 22. With respect to such a function of displaying the engine rotational speed, the engine rotational speed can be displayed by storing a dedicated computer program in the personal digital assistant 22 in advance. As a method for storing the computer program, a method where the computer program is stored when the personal digital assistant 22 is shipped, a method where the computer program is downloaded through an electric telecommunication line or the like can be named.

Further, the display may be performed such that the tachometer 19 is imaged by a moving image camera (imaging part) which is built in the personal digital assistant 22 or is provided as a part separate from the personal digital assistant 22, and the imaged tachometer 19 may be displayed on the display part 26 of the personal digital assistant 22 in real time.

As shown in FIG. 5, the image G is displayed relatively small on the display part 26 of the personal digital assistant 22 so that a space S is formed on the display part 26. By displaying information other than the engine rotational speed on such a space S, it is possible to provide a rider with large amount of beneficial information. As information displayed on the display part 26, information on an area where a motorcycle travels or the periphery of such an area, a map of the area where the motorcycle travels or the periphery of such an area or the like can be named.

To explain this embodiment in conjunction FIG. 6, the personal digital assistant 22 includes an imaging part 27 on a back surface thereof which constitutes a surface on a side opposite to the display part 26 and hence, an area in front of the vehicle can be imaged through the screen 8 in a state where the personal digital assistant 22 is held by the mounting member 21. In FIG. 6 and FIG. 4, an area a defined by a double-dashed chain line indicates an imaging range of the imaging part 27. Here, the holder case 24 is held by the mounting member 21 in a rotatable manner about the horizontal axis and hence, as shown in FIG. 6, an imaging angle can be changed by rotating the holder case 24. A size of a back surface portion of the holder case 24 which faces a portion of the holder case 24 where the window portion 25 is formed is set such that the imaging part 27 is exposed. In a case where the holder case 24 is rotatable about the horizontal axis, the display part 26 of the personal digital assistant 22 can be adjusted to a position where the display part 26 can be easily viewed by changing the inclination of the holder case 24.

FIGS. 14A to 14E show image examples where information other than the engine rotational speed is displayed on the display part 26 while displaying the engine rotational speed on the display part 26 of the personal digital assistant 22.

Figure 14A:
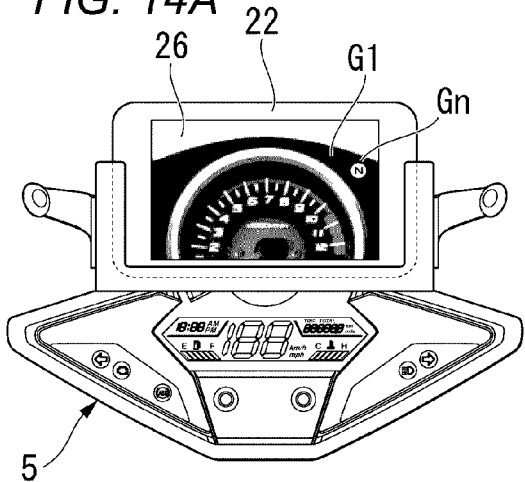
FIGS. 14A to 14E are views showing examples where the personal digital assistant is mounted on the mounting member of the first embodiment and an image of an engine rotational speed is displayed on the personal digital assistant.

FIG. 14A is an example where a portion of the tachometer 19 which is concealed by the personal digital assistant 22 is displayed on the display part 26 as an image G1 of the tachometer. Due to such a display, although the personal digital assistant 22 is disposed above the tachometer 19, it is possible to make the rider feel that the rider is visually recognizing the tachometer 19 directly. Even in a case where a part of or the whole neutral lamp 20 is concealed by a frame of the personal digital assistant 22 or the mounting member 21, it is also possible to display the neutral lamp on the display part 26 as an image Gn.

Figure 14B:
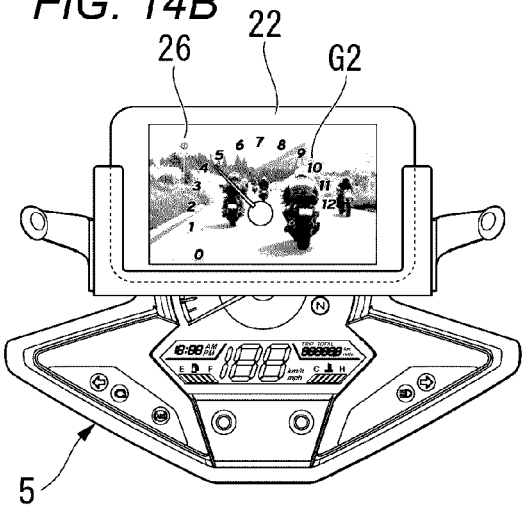

FIG. 14B is an example where an image of an area in front of the motorcycle 1 is imaged by the imaging part 27, and an image G2 of an analogue tachometer is displayed on the display part 26 in an overlapping manner while displaying such an imaged image on the display part 26.

Figure 14C:
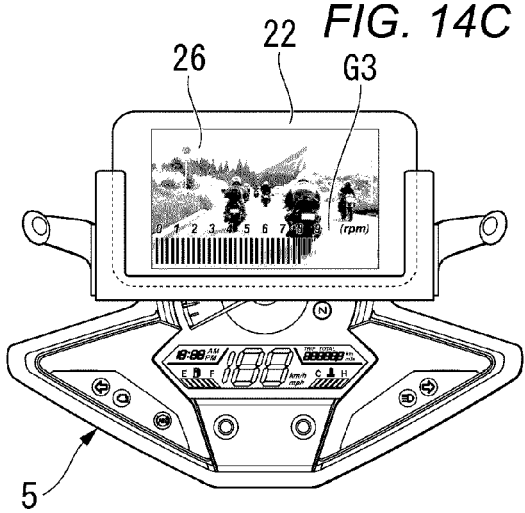

FIG. 14C is an example where an image of an area in front of the motorcycle 1 is imaged by the imaging part 27, and an image G3 of a digital tachometer is displayed on the display part 26 in an overlapping manner while displaying such an imaged image on the display part 26.

Figure 14D:
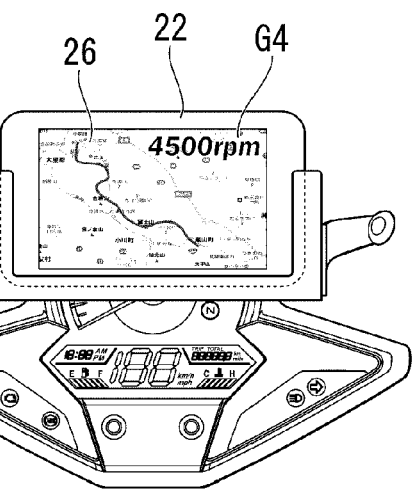

FIG. 14D is an example where an engine rotational speed image G4 which is constituted of only numerals is displayed on the display part 26 in an overlapping manner while displaying map information on the display part 26.

Figure 14E:
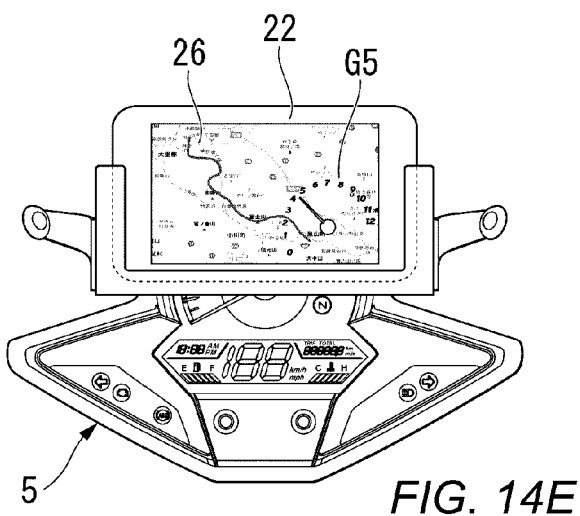

FIG. 14E is an example where an image G5 of an analogue tachometer is displayed on the display part 26 in an overlapping manner while displaying map information on the display part 26.

According to the first embodiment of the present invention described above, by focusing on a point that a member is not usually arranged on a line of sight along which the rider visually recognizes the meter case 5 and there is no particular restriction due to members around the information display device, a position where the tachometer 19 which is displayed by the meter case 5 becomes non-visible as viewed from the rider is set as the space for mounting the personal digital assistant 22 so that the personal digital assistant 22 can be easily mounted even in a vehicle having a small mounting space in a compact manner, and the favorable visibility of the personal digital assistant 22 can be ensured by arranging the personal digital assistant 22 on the line of sight along which the rider visually recognizes the meter case 5. Further, the vehicle information on the tachometer 19 which becomes non-visible by the personal digital assistant 22 is displayed on the display part 26 of the personal digital assistant 22 so that information other than the vehicle information which becomes non-visible can be also easily displayed on the personal digital assistant 22 while ensuring an information display function whereby it is possible to provide the user with information beneficial to the user.

Further, the personal digital assistant 22 includes the imaging part 27 on the back surface of the display part 26 which faces a rider's side, and is mounted on the vehicle in a rotatable manner about the horizontal axis and hence, the imaging part 27 can perform imaging in the direction of a line of sight of a rider whereby the utilization of a system having a high taste for the user becomes possible. Further, the personal digital assistant 22 is mounted on the vehicle in a rotatable manner about the horizontal axis and hence, imaging in a wide range becomes possible so that desired imaging can be performed irrespective of the arrangement and the shape of the meter case 5 in the vehicle and the arrangement and the shape of the members around the meter case 5 in the vehicle.

The personal digital assistant 22 is mounted on the vehicle in such a manner that the personal digital assistant 22 is covered with the screen 8 from above and hence, the personal digital assistant 22 can be protected from rain or the like. Further, the mounting member 21 is fixed to the vehicle by being fastened together with the screen 8 and hence, the mounting member 21 can be easily mounted while suppressing the number of parts.

Further, the meter case 5 is supported on the vehicle by way of the vibration-proof rubber 37 which is the resilient member and, as shown in FIG. 7, the personal digital assistant 22 is arranged in such a manner that the personal digital assistant 22 straddles the meter case 5 with the gap formed between the personal digital assistant 22 and the meter case 5 by the stays 23, 23 of the mounting members 21 arranged in such a manner that the stays 23, 23 sandwich the meter case 5 (tachometer 19) and hence, a reaction force from the personal digital assistant is not applied to the meter case 5 at the time of mounting or dismounting the personal digital assistant 22 whereby a vibration proof effect of the meter case 5 can be favorably maintained.

Further, although the vehicle information displayed by the meter case 5 which becomes non-visible by the portable digital assistant 22 is an engine rotational speed, in such a case, a relatively large degree of freedom can be given to a display method compared to a speed display or the like and hence, an engine rotational speed can be suitably displayed in conformity with a taste of a rider while surely allowing a user to visually recognize a fundamental display such as a speed display, and other information is displayed on the personal digital assistant 22 as additional information whereby the availability of the personal digital assistant 22 can be enhanced. Further, the personal digital assistant 22 is a telephonic-call-capable personal digital assistant and hence, the user can freely use the information display according to the present invention.

Second Embodiment

Next, the second embodiment of the present invention is explained in conjunction with FIG. 8. This embodiment differs from the first embodiment in a shape of a holder case of a mounting member for a personal digital assistant. Hereinafter, constitutional elements of this embodiment substantially identical to the constitutional part of the first embodiment are indicated by the same symbols as the first embodiment and the explanation of these constitutional elements is omitted.

Figure 8A:
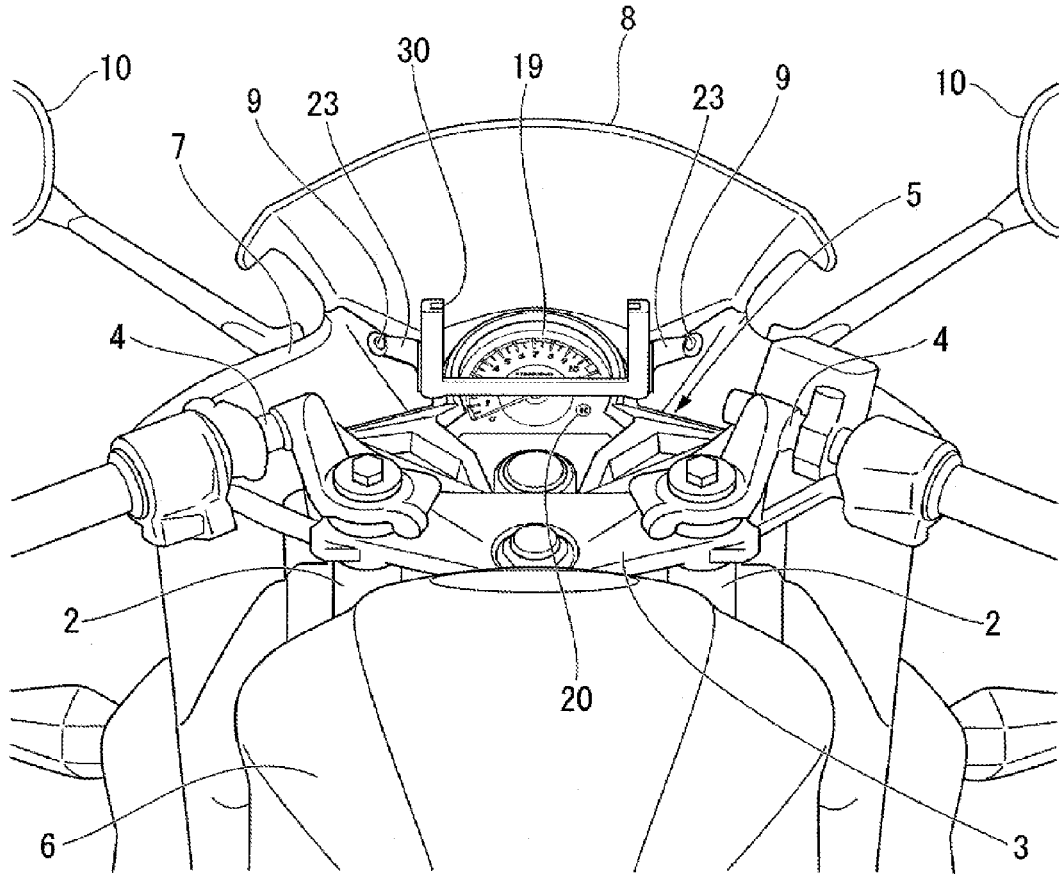

As shown in FIG. 8A, in this embodiment, a holder case 30 is constituted of a U-shaped frame body, and respective side portions which form a U shape is formed into a hollow shape which has a U shape in cross section and is opened toward the inside of the frame body. A personal digital assistant 22 is mounted in the holder case 30 in such a manner that three sides of the personal digital assistant 22 are sandwiched in the hollow portions of the respective U-shaped side portions of the holder case 30, and a display part 26 is exposed from the holder case 30. Further, stays 23, 23 support proximal end sides of the side portions of the holder case 30 arranged opposite to each other in a U shape.

In this embodiment, the most part of a tachometer 19 of a meter case 5 is viewable in a state where the personal digital assistant 22 is not mounted in the holder case 30 and hence, the visibility of the tachometer 19 in a state where the personal digital assistant 22 is not mounted in the holder case 30 can be increased. Further, imaging can be desirably performed irrespective of a position where an imaging part 27 of the personal digital assistant 22 is mounted thus improving the convenience in using the personal digital assistant 22.

Figure 8B:
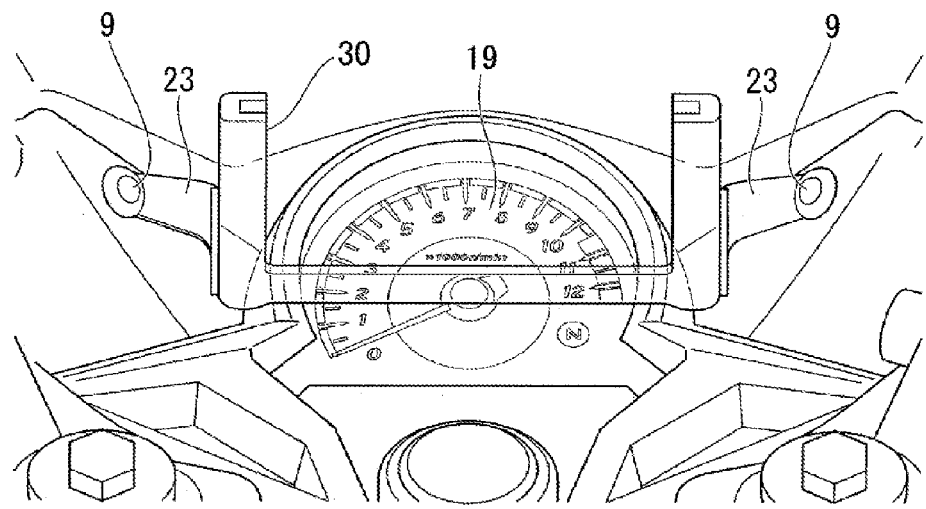

Further, as shown in FIG. 8B, the holder case 30 may be formed of a transparent body thus further increasing the visibility. Further, by also forming a back surface of the holder case 24 of the first embodiment using a transparent body, the visibility of the tachometer 19 can be increased while securing the rigidity of the holder case 24.

Figure 9A:
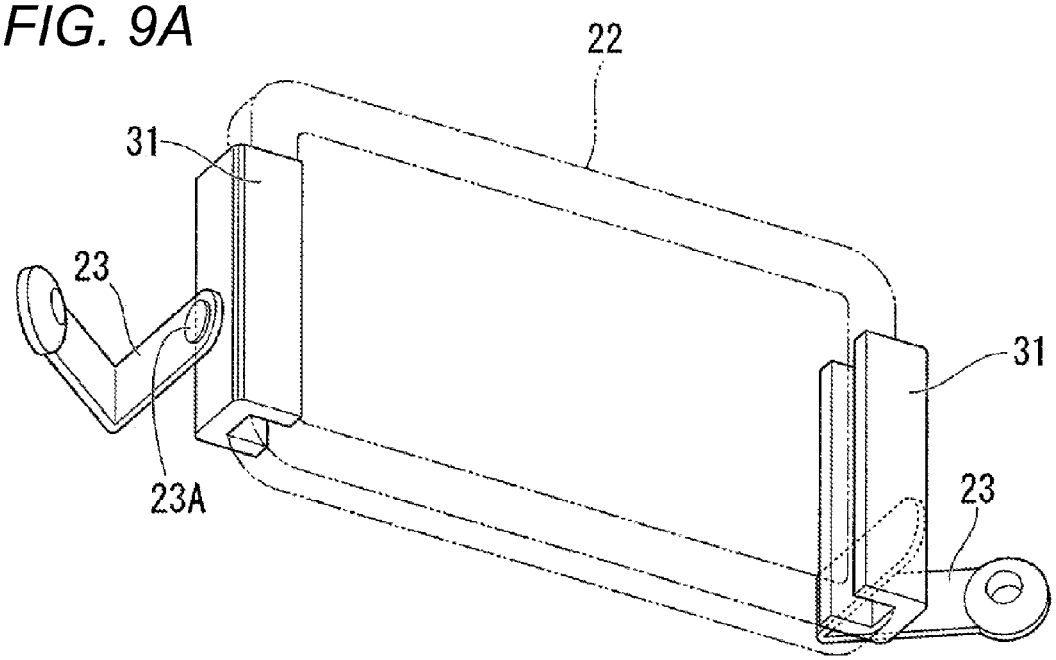
Figure 9B:
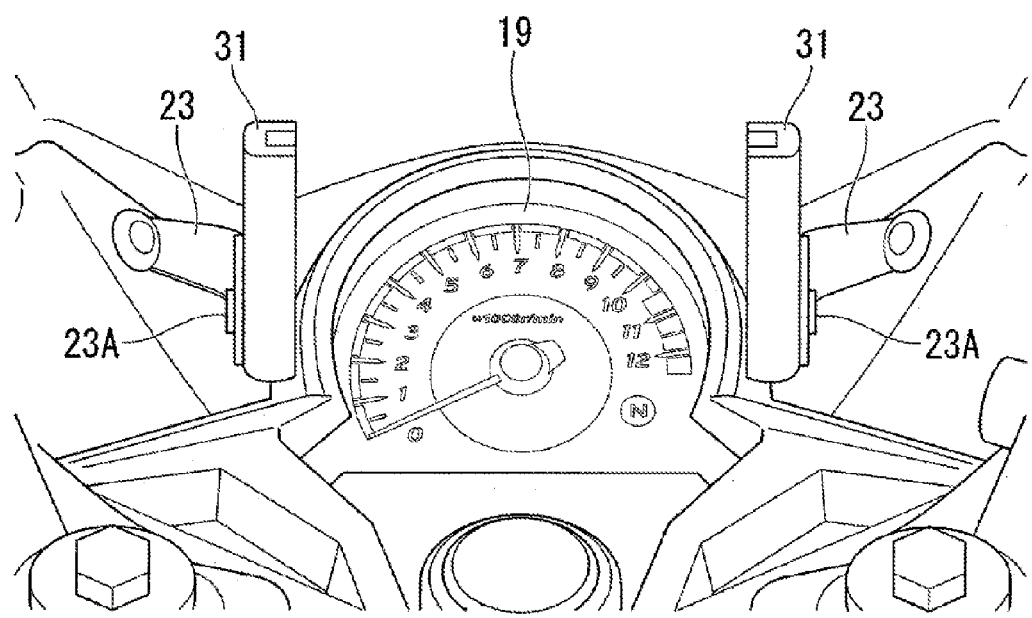

FIG. 9A and FIG. 9B show a modification of this embodiment. In this modification, on hinge shafts 23A, 23A which are formed on distal end portions of stays 23, 23 and extend toward the inside in the vehicle widthwise direction, holder portions 31, 31 which are formed of an elongated frame and extend in the direction orthogonal to the hinge shafts 23A, 23A are rotatably supported. The holder portions 31, 31 are mounted such that the opening portions of the holder portions 31, 31 having a U shape in cross section face each other in an opposed manner and the holder portions 31, 31 sandwich the personal digital assistant 22. In this case, as shown in FIG. 9B, the whole area of the tachometer 19 is viewable from a rider.

In a case where the most portion of the tachometer 19 of the meter case 5 can be visually recognized in a state where the personal digital assistant 22 is not mounted on the holder case 30 or the holder portions 31 as in the case of this embodiment, a surface of the personal digital assistant 22 on a display part 26 side and a surface of the personal digital assistant 22 on a side opposite to the display part 26 side surface are exposed to the outside. In this case, functions of the personal digital assistant 22 can be utilized. To be more specific, for example, the holder case 30 is rotatably adjusted such that the display part 26 of the personal digital assistant 22 faces a screen 8, light is irradiated to the screen 8 from the display part 26, and light is reflected on an inner surface of the screen 8 so that an image is displayed on the inner surface of the screen 8 whereby the screen 8 can be used in the same manner as a head-up display.

Third Embodiment

Next, the third embodiment of the present invention is explained in conjunction with FIG. 10. This embodiment differs from the first embodiment in a shape of a mounting member for a personal digital assistant. Hereinafter, constitutional elements of this embodiment substantially identical to the constitutional part of the first embodiment are indicated by the same symbols as the first embodiment and the explanation of these constitutional elements is omitted.

In FIG. 10, a mounting member 40 according to this embodiment is indicated by dots for the sake of facilitating the explanation. As shown in FIG. 10A, the mounting member 40 of this embodiment is formed of an approximately circular member which is arranged inside a front frame portion 13 so as to cover a tachometer 19. An end portion of the mounting member 40 positioned on a liquid crystal panel 14 side extends straightly in the vehicle widthwise direction and, as shown in FIG. 10B, a hook portion 41 having an L-shaped cross section which is engaged with a personal digital assistant 22 is integrally formed with the end portion in a state where the hook portion 41 extends toward a rider's side.

Although the mounting member 40 is configured to be fitted into the inside of the front frame portion 13 in this embodiment, the mounting member 40 may be mounted by adhesion or may be integrally formed with the front frame portion 13. A plurality of cut-away portions 42 through which a portion of the tachometer 19 is viewable in a state where the personal digital assistant 22 is removed are formed in the mounting member 40. That is, the mounting member 40 is formed into a shape excellent in design where the cut-away portions 42 form a character.

In this embodiment, by forming the cut-away portions 42 through which a portion of the tachometer 19 is viewable in a state where the personal digital assistant 22 is removed, it is possible to provide a display device for a vehicle having a unique shape.

Figure 11:
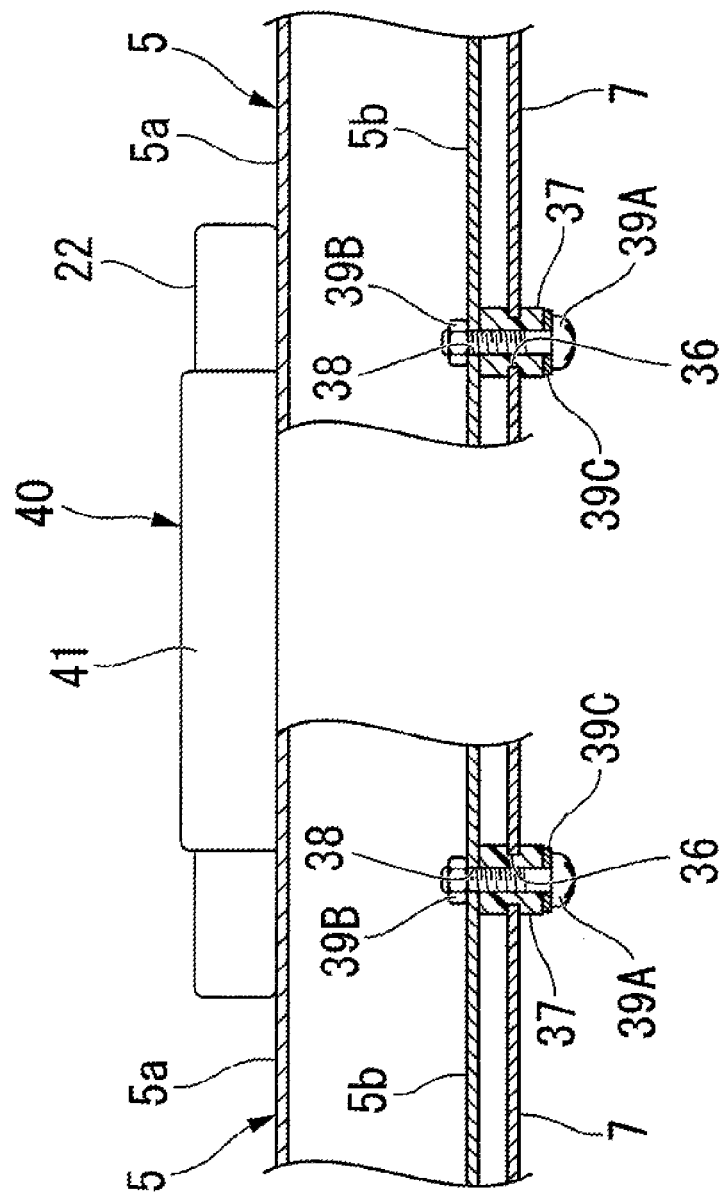
FIG. 11 is a schematic cross-sectional view of the meter case according to a third embodiment, and is also a view for explaining the arrangement of the meter case and a personal digital assistant.

Further, to explain this embodiment in conjunction with FIG. 11, also in this embodiment, a meter case 5 is supported on a vehicle by way of a vibration-proof rubber 37 which is an elastic member. The mounting member 40 is mounted on the tachometer 19 of the meter case 5 so that the personal digital assistant 22 is supported on the meter case 5 and hence, a vibration-proofing effect of the personal digital assistant 22 can be secured by the vibration-proof rubber 37.

Fourth Embodiment

Figure 12:
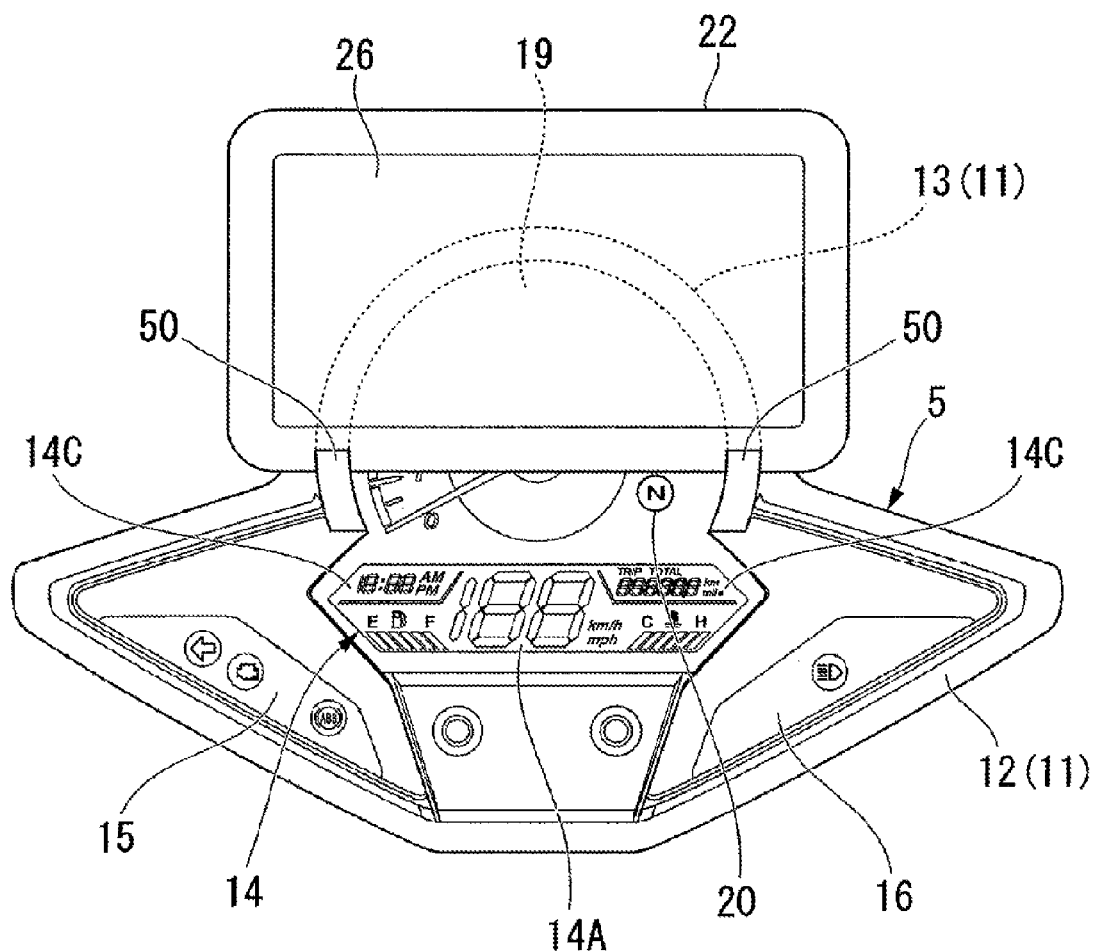
FIG. 12 is a view showing a meter case in a state where a mounting member according to a fourth embodiment is mounted.

Next, the fourth embodiment of the present invention is explained in conjunction with FIG. 12. This embodiment differs from the first embodiment in the constitution of a mounting member for a personal digital assistant. Hereinafter, constitutional elements of this embodiment substantially identical to the constitutional part of the first embodiment are indicated by the same symbols as the first embodiment and the explanation of these constitutional elements is omitted.

As shown in FIG. 12, in this embodiment, a pair of left and right mounting members 50, 50 having an L-shaped cross section which is engaged with a personal digital assistant 22 are integrally formed with a front frame portion 13 in the vicinity of a position where the front frame portion 13 is connected with a base frame portion 12. According to this embodiment, the mounting member for the personal digital assistant 22 can be easily formed by molding.

Fifth Embodiment

Figure 13:
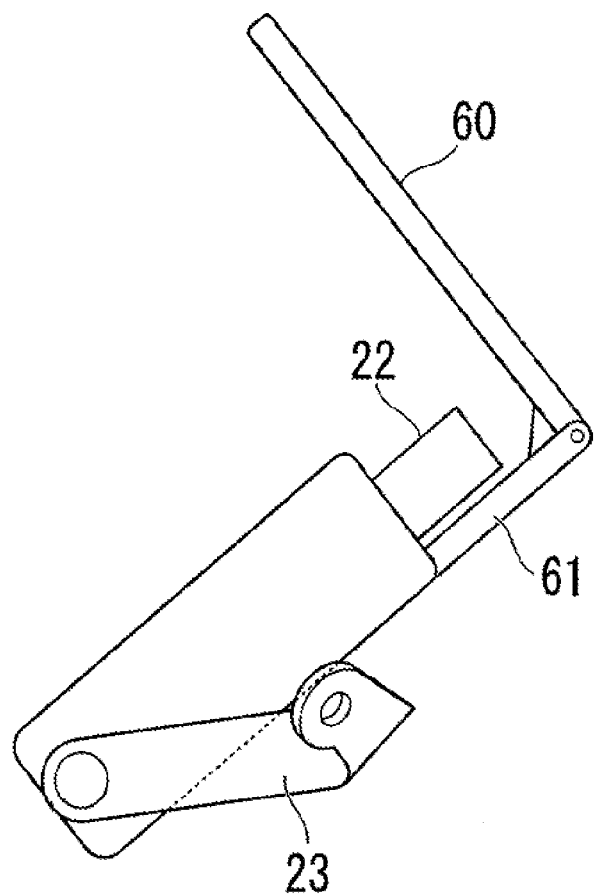
FIG. 13 is a view for explaining a mounting member according to a fifth embodiment of the present invention.

Next, the fifth embodiment of the present invention is explained in conjunction with FIG. 13. In this embodiment, as shown in FIG. 13, a shade portion 60 is mounted on the mounting member 21 of the first embodiment. In this embodiment, a back surface portion 61 of the mounting member 21 on a side opposite to a side where the window portion 25 is formed is formed in an upwardly elongated manner, and projects more upwardly than an end portion of a personal digital assistant 22 in a state where the personal digital assistant 22 is mounted, and the shade portion 60 is rotatably supported on an upper end portion of the back surface portion.

When the shade portion 60 is formed in this manner, by preventing sun beams from impinging on a display part 26 of the personal digital assistant 22 corresponding to an angle of sun beams, the visibility of the display part 26 can be enhanced.

Although the respective embodiments of the present invention have been explained heretofore, the present invention is not limited to the above-mentioned embodiments, and various changes can be added to the embodiments without departing from the gist of the present invention.

For example, in the above-mentioned respective embodiments, the example where the smart phone is mounted on the vehicle has been explained. However, the personal digital assistant may be a personal digital assistant which has no telephonic call capability. Further, the personal digital assistant referred in the present invention means an information terminal having a function of acquiring vehicle information and displaying the vehicle information on a display part. Accordingly, provided that an information terminal has such functions, a terminal or the like which is constituted mainly for navigation, a so-called tablet type terminal having a larger size than a smart phone may be also used.

Further, vehicle information displayed on the personal digital assistant may be information other than an engine rotational speed. For example, the vehicle information may be information on water temperature meter, a fuel meter, a gear position, a high-beam switching display, a blinker indicator or a speedometer which conforms to laws and regulations.

In this case, information may be displayed by the same expression method as the meter case 5 which is an information display device. Besides changing a display from an analogue display to a digital display, an expression method such as color, a character, a graph display mode or a lighting mode may be changed. Further, a rider can select such a display method using an interface such as a touch panel represented by a smart phone.

Further, although the example where the present invention is applied to the motorcycle which is a saddle-ride-type vehicle has been explained in the above-mentioned respective embodiments, the present invention is also applicable to a four-wheeled buggy car or an automobile.

According to the embodiment, there is provided an information display system for a vehicle including: an information display device (5) which is mounted on a vehicle (1) and displays vehicle information on the vehicle (1); and a personal digital assistant (22) which includes a communication part which acquires vehicle information outputted from an electric accessory unit mounted on the vehicle (1), and a display part (26) which displays the vehicle information acquired using the communication part, wherein the personal digital assistant (22) is mounted on the vehicle (1), and the vehicle information is displayed on the display part (26) of the personal digital assistant (22), wherein the personal digital assistant (22) is detachably mounted on the vehicle (1) by a mounting member (21, 40, 50) which is fixed on a vehicle (1) side in such a manner that at least some of the vehicle information displayed by the information display device (5) becomes non-visible, and in the personal digital assistant (22), at least the vehicle information displayed by the information display device (5) which becomes non-visible is acquired using the communication part, and the vehicle information is displayed on the display part (26).

Further, the above-mentioned information display system is characterized in that the personal digital assistant (22) includes an imaging part (27) on a back surface of the display part (26) which faces a rider's side, and is mounted on the vehicle (1) in a rotatable manner about a horizontal axis.

Further, the above-mentioned information display system is characterized in that the vehicle (1) is a saddle-ride-type vehicle where a screen (8) is arranged in front of the information display device (5) in the longitudinal direction of the vehicle, and the personal digital assistant (22) is mounted such that the personal digital assistant (22) is covered with the screen (8) from above.

Further, the above-mentioned information display system is characterized in that the mounting member (21) is fixed to the vehicle (1) by being fastened together with the screen (8).

Further, the above-mentioned information display system is characterized in that the information display device (5) is supported on the vehicle (1) by way of a resilient member (37), and the personal digital assistant (22) is arranged in such a manner that the personal digital assistant (22) straddles the information display device (5) with a gap formed between the personal digital assistant (22) and the information display device (5) by the mounting member (21) which is arranged so as to sandwich the information display device (5).

Further, the above-mentioned information display system is characterized in that the information display device (5) is supported on the vehicle (1) by way of the resilient member (37), the mounting member (40, 50) is mounted on the information display device (5), and the personal digital assistant (22) is supported on the information display device (5).

Further, the above-mentioned information display system is characterized in that the vehicle information displayed by the information display device (5) which becomes non-visible by the personal digital assistant (22) is an engine rotational speed.

Further, the above-mentioned information display system is characterized in that the personal digital assistant (22) is a telephonic-call-capable personal digital assistant.

Further, according to the embodiment, there is also provided an information display method for a vehicle where using: an information display device (5) which is mounted on a vehicle (1) and displays vehicle information on the vehicle (1); and a personal digital assistant (22) which includes a communication part which acquires vehicle information outputted from an electric accessory unit mounted on the vehicle (1), and a display part (26) which displays the vehicle information acquired using the communication part, the personal digital assistant (22) is detachably mounted on the vehicle (1), and the vehicle information is displayed on the display part (26) of the personal digital assistant (22), wherein the personal digital assistant (22) is mounted on the vehicle (1) in such a manner that at least some of the vehicle information displayed by the information display device (5) becomes non-visible, and in the personal digital assistant (22), at least the vehicle information displayed by the information display device (5) which becomes non-visible is acquired using the communication part, and the vehicle information is displayed on the display part (26).

Further, according to the embodiment, there is also provided a vehicle including: an information display device (5) which is mounted on a vehicle (1) and displays vehicle information on the vehicle (1), wherein the vehicle (1) includes a mounting member (21, 40, 50) for mounting a personal digital assistant (22) which includes a communication part which acquires vehicle information outputted from an electric accessory unit mounted on the vehicle (1), and a display part (26) which displays the vehicle information acquired using the communication part, the mounting member (21, 40, 50) is configured to mount the personal digital assistant (22) thereon in such a manner that at least some of the vehicle information displayed by the information display device (5) becomes non-visible by the personal digital assistant (22), and the mounting member (21, 40, 50) is provided for mounting the personal digital assistant (22) having a function of acquiring at least the vehicle information displayed by the information display device (5) which becomes non-visible using the communication part, and displaying the vehicle information on the display part (26).

Further, according to the embodiment, there is also provided a mounting member for detachably mounting a personal digital assistant (22) on a vehicle (1), the mounting member being mounted on the vehicle (1) including an information display device (5) which is mounted on the vehicle (1) and displays vehicle information on the vehicle (1), and the personal digital assistant (22) including a communication part which acquires vehicle information outputted from an electric accessory unit mounted on the vehicle (1), and a display part (26) which displays the vehicle information acquired using the communication part, wherein the mounting member is configured to mount the personal digital assistant (22) thereon in such a manner that at least some of the vehicle information displayed by the information display device (5) becomes non-visible by the personal digital assistant (22), and the mounting member is provided for mounting the personal digital assistant (22) having a function of acquiring at least the vehicle information displayed on the information display device (5) which becomes non-visible using the communication part, and displaying the vehicle information on the display part (26).

According to the embodiment, by focusing on a point where a member is not usually arranged on a line of sight along which a user visually recognizes the information display device and there is no particular restriction due to members around the information display device, a position where at least some vehicle information displayed by the information display device becomes non-visible is set as the space for mounting the personal digital assistant so that the personal digital assistant can be easily mounted even in a vehicle having a small mounting space, and the favorable visibility of the personal digital assistant can be ensured by arranging the personal digital assistant on the line of sight along which the user visually recognizes the information display device. Further, the vehicle information which becomes non-visible by the personal digital assistant is displayed on the display part of the personal digital assistant so that information other than the vehicle information which becomes non-visible can be also easily displayed on the personal digital assistant while ensuring an information display function whereby it is possible to provide the user with information beneficial to the user.

When the personal digital assistant according to the embodiment includes the imaging part on the back surface of the display part which faces a rider's side, and is mounted on the vehicle in a rotatable manner about the horizontal axis, the imaging part can perform imaging in the direction of a line of sight of a rider and hence, the utilization of a system having a high taste for the user becomes possible. Further, the personal digital assistant is mounted on the vehicle in a rotatable manner about the horizontal axis and hence, imaging in a wide range becomes possible so that desired imaging can be performed irrespective of the arrangement and the shape of the information display device in the vehicle and the arrangement and the shape of the members around the information display device in the vehicle.

When the personal digital assistant according to the embodiment is mounted on the vehicle in such a manner that the personal digital assistant is covered with the screen from above, the personal digital assistant can be protected from rain or the like.

When the mounting member according to the embodiment is fixed to the vehicle by being fastened together with the screen, the mounting member can be easily mounted while suppressing the number of parts.

Further, when the information display device according to the embodiment is supported on the vehicle by way of the resilient member, and the personal digital assistant according to the embodiment is arranged in such a manner that the personal digital assistant straddles the information display device with the gap formed between the personal digital assistant and the information display device by the mounting member which is arranged so as to sandwich the information display device, a reaction force from the personal digital assistant is not applied to the information display device at the time of mounting or dismounting the personal digital assistant and hence, a vibration proof effect of the information display device can be favorably maintained.

When the information display device according to the embodiment is supported on the vehicle by way of the resilient member, the mounting member is mounted on the information display device, and the personal digital assistant is supported on the information display device, a vibration proof effect of the personal digital assistant can be ensured by the resilient member which supports the information display device on the vehicle.

When the vehicle information displayed by the information display device which becomes non-visible by the portable digital assistant is an engine rotational speed, a relatively large degree of freedom can be given to a display method compared to a speed display or the like and hence, an engine rotational speed can be suitably displayed selectively in conformity with a taste of a rider while surely allowing a user to visually recognize a fundamental display such as a speed display, and other information is displayed on the personal digital assistant as additional information whereby the availability of the personal digital assistant according to the embodiment can be enhanced.

When the personal digital assistant is a telephonic-call-capable personal digital assistant, the information display according to the embodiment can be freely used.

Obviously, numerous modifications and variations of the present invention are possible in light of the above teachings. It is therefore to be understood that within the scope of the appended claims, the invention may be practiced otherwise than as specifically described herein.

What is claimed is:

1. An information display system for a vehicle, comprising:
   an information display device mounted on a vehicle and configured to display vehicle information;
   a mounting member fixed to the vehicle; and
   a personal digital assistant detachably mounted on the vehicle via the mounting member in such a manner that at least a part of the vehicle information displayed on the information display device becomes obscured by the personal digital assistant and comprising:
      a communication device configured to acquire at least vehicle information which is displayed on the information display device and which becomes obscured by the personal digital assistant mounted on the vehicle; and
      a display device configured to display the vehicle information acquired using the communication device,
   wherein the personal digital assistant includes an imaging device provided on an opposite surface of the display device and the personal digital assistant is mounted on the vehicle in a rotatable manner about a horizontal axis, and
   wherein only an upper portion of the information display device becomes obscured by the personal digital assistant.

2. The information display system for a vehicle according to claim 1, wherein
   the vehicle comprises a saddle-ride vehicle including a screen arranged in front of the information display device in a longitudinal direction of the vehicle, and
   the personal digital assistant is mounted to be covered with the screen from above.

3. The information display system for a vehicle according to claim 2, wherein the mounting member is fixed to the vehicle by being fastened together with the screen.

4. The information display system for a vehicle according to claim 1, wherein
   the information display device is supported on the vehicle via a resilient member, and
   the personal digital assistant is arranged in such a manner that the personal digital assistant straddles the information display device with a gap formed between the personal digital assistant and the information display device by the mounting member which has side portions arranged so as to sandwich the information display device.

5. The information display system for a vehicle according to claim 1, wherein
   the information display device is supported on the vehicle via a resilient member,
   the mounting member is mounted on the information display device, and
   the personal digital assistant is supported on the information display device.

6. The information display system for a vehicle according to claim 1, wherein
   the vehicle information which is displayed on the information display device and which becomes obscured by the personal digital assistant includes an engine rotational speed.

7. The information display system for a vehicle according to claim 1, wherein the personal digital assistant comprises a telephonic-call-capable personal digital assistant.

8. The information display system for a vehicle according to claim 1, wherein the information display device comprises a meter case.

9. An information display method for a vehicle, comprising:
   displaying vehicle information on an information display device;
   mounting a personal digital assistant with an imaging device on an opposite surface of a display device of the personal digital assistant such that the personal digital assistant is rotatable about a horizontal axis;
   acquiring at least vehicle information which is displayed on the information display device and which becomes obscured by the personal digital assistant from the vehicle using a communication device of the personal digital assistant; and
   displaying the vehicle information acquired using the communication device on the display device of the personal digital assistant,
   wherein only an upper portion of the information display device becomes obscured by the personal digital assistant.

10. The method according to claim 9, wherein the information display device comprises a meter case.

11. A vehicle comprising:
    an information display device configured to display vehicle information; and
    a mounting member to mount a personal digital assistant that includes an imaging device provided on an opposite surface of a display device, the mounting member mounting the personal digital assistant on the vehicle in such a manner that at least a part of the vehicle information displayed on the information display device becomes obscured by the personal digital assistant, the personal digital assistant including a communication device configured to acquire at least vehicle information displayed on the information display device which becomes obscured by the personal digital assistant mounted on the vehicle, and the display device is configured to display the vehicle information acquired using the communication device,
    wherein the mounting member is configured to mount the personal digital assistant on the vehicle in a rotatable manner about a horizontal axis and such that only an upper portion of the information display device becomes obscured by the personal digital assistant.

12. The vehicle according to claim 11, wherein the information display device comprises a meter case.

13. A mounting member comprising:
a first portion to be mounted on a vehicle; and
a second portion to detachably support a personal digital assistant including a display device, an imaging device on an opposite surface of the display device, and a communication device configured to acquire vehicle information outputted from an electric accessory unit mounted on the vehicle, the display device configured to display the vehicle information acquired using the communication device, the second portion being provided in such a manner that at least a part of the vehicle information displayed on an information display device of the vehicle becomes obscured by the personal digital assistant,
wherein the second portion is configured to support the personal digital assistant in a rotatable manner about a horizontal axis and such that only an upper portion of the information display device becomes obscured by the personal digital assistant.

14. The mounting member according to claim 13, wherein the information display device comprises a meter case.

* * * * *